Dec. 1, 1964 E. F. BEST 3,158,971
SURFACING PLATE GLASS
Filed Jan. 2, 1963
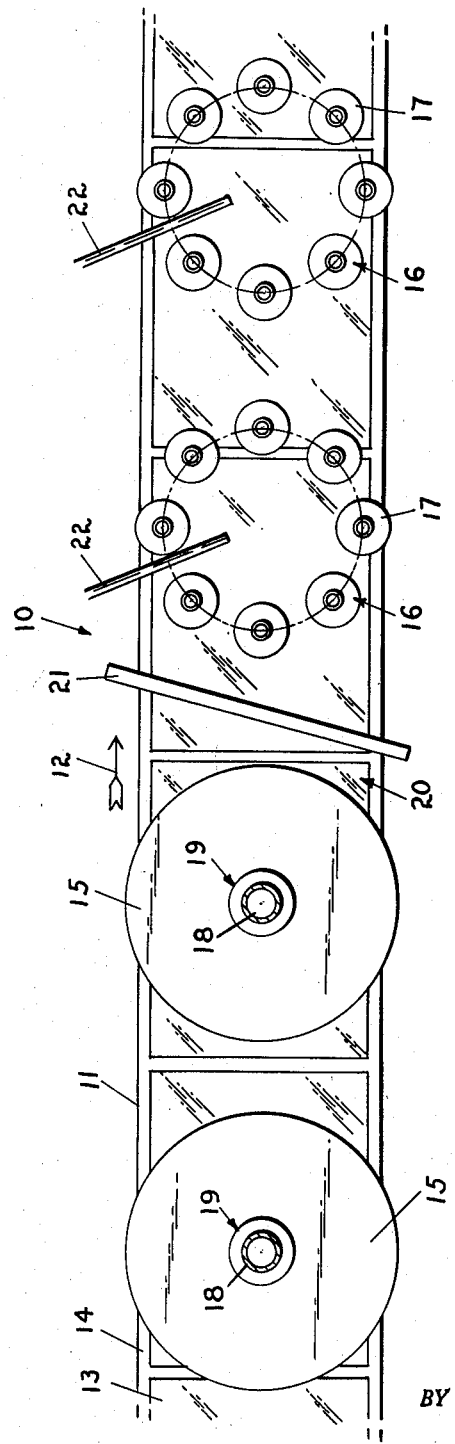
INVENTOR.
Edison F. Best
BY
Nobbe & Swope
ATTORNEYS

United States Patent Office 3,158,971
Patented Dec. 1, 1964

3,158,971
SURFACING PLATE GLASS
Edison F. Best, Maumee, Ohio, assignor to Libbey-Owens-Ford Glass Company, Toledo, Ohio, a corporation of Ohio
Filed Jan. 2, 1963, Ser. No. 249,560
13 Claims. (Cl. 51—283)

The present invention relates broadly to the production of plate glass, and more particularly to a novel procedure and material for use in polishing the blanks from which such glass is made.

This application is a continuation-in-part of my co-pending application Serial No. 078,776, filed December 27, 1960, now abandoned, which in turn is a continuation-in-part of my original application Serial No. 809,218, filed April 27, 1959, now abandoned.

As is well known, plate glass is produced commercially by first, rough forming a more or less continuous ribbon from a mass of molten glass and then surfacing one or both sides thereof while the ribbon, or individual blanks that have been cut therefrom, are moved continuously along a predetermined path. During such surfacing the glass is passed first through a grinding area and then through a polishing area. In the grinding area, at least one surface of the glass is subjected to the abrasive action of sand of progressively decreasing coarseness under heavy iron runners; and in the polishing area the previously ground surface is polished with rouge under relatively soft pads such as wool or hair felt.

This polishing with rouge (iron oxide), in a water slurry and with copperas added, has been used in the plate glass industry for a great many years and, at the time the present invention was made, it was still the conventional and commercially accepted method of finally polishing previously ground plate glass blanks. Various other polishing materials and mixtures have been suggested and tried from time to time in an effort to obtain a faster and/or better controlled polishing action, but one by one these have been discarded.

For example, cerium oxide is well known as a polishing agent in the optical glass industry, but has never been considered applicable to the polishing of previously ground plate glass blank surfaces. First, because of its relatively high costs as compared with iron oxide; and, second, because it often produces a dull surface defect on the finished glass plates by reason of a characteristically cloudy film which it leaves, and which once formed is very difficult to remove.

Now, however, I have discovered that, contrary to former beliefs, when cerium oxide is incorporated into a special polishing composition, it can be advantageously used in the polishing of plate glass.

This is the basis of the present invention and, in laboratory polishing tests conducted with plate glass and using wool and hair felts I have found that the special polishing composition of the invention will polish approximately one and one-half times as fast as the conventional rouge-copperas-water slurry under the same conditions, and will produce a bright, clear and highly transparent polished surface.

Briefly stated, the invention contemplates the polishing of previously ground plate glass blank surfaces with conventional polishing tools and a mixture of cerium oxide and cerous nitrate with water.

It is therefore a primary object of this invention to provide a novel method of polishing plate glass blanks to obtain an improved finish, and in a shorter time than has heretofore been considered possible.

Another object is the provision for use in such a method of a novel and improved composition of polishing materials.

Other objects and advantages of the invention will become more apparent during the course of the following description when taken in connection with the accompanying drawings.

In the drawings, wherein like numerals are employed to designate like parts throughout the same:

The single figure is a fragmentary diagrammatic plan view of a continuous grinding and polishing line upon which the method of the invention may be practiced.

Referring now more particularly to these drawings, there is designated generally by the numeral 10 a conventional type of plate glass grinding and polishing line that is made up of a series of tables 11 mounted for continuous horizontal movement in the direction of the arrow 12 and adapted to receive a series of plate glass blanks 13 arranged in end-to-end relation and embedded in a layer of plaster 14 on the tables.

As the tables 11 are moved forwardly, the glass sheets carried thereby will be moved, first beneath a series of rotating grinding tools 15, and then beneath a series of rotating polishing runners 16 each of which includes a plurality of felt covered polishing tools 17 mounted for independent rotary movement on their own axes. As the glass sheets move beneath the grinding runners 15, a mixture of sand and water is fed between the grinding runners and the glass through a conduit 18 in the shaft 19 of the runner.

As the glass passes through the area 20, between the grinding runners 15 and the polishing runners 16, the sand and water employed during the grinding action is removed from the glass surface by means of suitable squeegees 21 or the like.

During passage beneath the polishing tools 16 the polishing composition of the invention is fed onto the glass surface and between the polishing tools and the glass. This may be done in any suitable manner, such as by means of pipes or hoses 22.

As indicated above, the special polishing composition of the invention comprises a mixture of water, cerium oxide and cerous nitrate. For a dilute slurry of the type necessary for the continuous polishing of plate glass, best results have been obtained with a composition made up with 100 parts by weight of water, from 1 to 10 parts cerium oxide, and between 0.5 and 5 parts cerous nitrate hexahydrate. However, for all around use, excellent results may be had with a composition made up of 100 parts by weight of water, from 1 to 60 parts of cerium oxide, and from 0.2 to 10 parts cerous nitrate hexahydrate.

Somewhat surprisingly, I have found that the presence of the cerous nitrate in the indicated amounts notably improves the normal polishing efficiency of the cerium oxide in the water slurry. Moreover, it prevents the formation of the cloudy film that has heretofore presented a very serious problem when cerium oxide was employed in the dilute slurries that have to be used for production line polishing of plate glass blanks.

In the following example there is listed a preferred composition of the polishing material of the invention:

*Example I*

| | Parts |
|---|---|
| Water | 100 |
| Cerium oxide | 5 |
| $Ce(NO_3)_3 \cdot 6H_2O$ | 1 |

A modified, but similar composition is listed in the following example:

*Example II*

| | | |
|---|---|---|
| Water | gal | 300 |
| Cerium oxide | lbs | 144 |
| Cerous nitrate hexahydrate | lbs | 50 |

In a comparison test using the composition of Example I, the glass removal rate of this mixture was approximately 125 mgs. per ten minutes as compared to 80 mgs. in ten minutes for a conventional polishing mixture of rouge, copperas and water used on commercial production plate glass polishing lines.

It will be noted that the cerous nitrate content in all of the above examples and compositions has been expressed in terms of cerous nitrate hexahydrate. This is because I found the hexahydrate to be the most convenient and easily usable form of the compound. Obviously, however, the cerous nitrate could be introduced into the polishing composition in other ways and, when this is done, it may necessitate a simple calculation based on the values set forth above to determine the amount of any different material that may be used to introduce the cerous nitrate.

For example, anhydrous cerous nitrate may be used and when this is done only from approximately 0.15 to 7.5 parts need be used to yield the same amount of cerous nitrate as from 0.2 to 10 parts of cerous nitrate hexahydrate will yield.

One other ancillary feature of the invention that may be important is my discovery that any foaming encountered with the slurry, and which may result in a loss of material when a recirculating system is used, can be adequately controlled if not entirely eliminated by including in the polishing composition approximately one part by volume of a modified polyhydric alcohol mixed ester, to 1000 parts of the polishing slurry, as a defoaming agent.

It is to be understood that the forms of the invention herewith shown and described are to be taken as illustrative embodiments only of the same, and that various changes in the shape, size and arrangement of parts, as well as various changes in procedures and compositions may be resorted to without departing from the spirit of the invention or the scope of the subjoined claims.

I claim:

1. In a method of finishing a glass surface, the step of polishing said surface by rubbing a mixture of water, cerium oxide and cerous nitrate hexahydrate in the proportions of 100 parts by weight of water, with from 1 to 60 parts by weight of cerium oxide, and from 0.2 to 10 parts of cerous nitrate hexahydrate over said surface with a soft tool.

2. In a continuous method of finishing the surfaces of rough glass blanks, the steps of moving said surfaces along a fixed path, and during said movement first grinding said surfaces by rubbing sand of progressively decreasing particle sizes in a water slurry over said surfaces with hard tools, and then polishing said previously ground surfaces by rubbing a mixture including water, cerium oxide and cerous nitrate hexahydrate in proportions of 100 parts by weight of water to from 1 to 10 parts of cerium oxide and from 0.5 to 5 parts cerous nitrate hexahydrate over said surfaces with a relatively soft tool.

3. A method as defined in claim 2 in which the polishing mixture is rubbed over the surfaces with a felt covered tool.

4. In a continuous method of finishing the surfaces of rough glass blanks, the steps of moving said surfaces along a fixed path, and during said movement first grinding said surfaces by rubbing sand of progressively decreasing particle sizes in a water slurry over said surfaces with hard tools, and then polishing said previously ground surfaces by rubbing a mixture comprising the following ingredients in substantially the following proportions:

| | Parts |
|---|---|
| Water | 100 |
| Cerium oxide | 5 |
| $Ce(NO_3)_3 \cdot 6H_2O$ | 1 | over said surfaces with a relatively soft tool.

5. A polishing composition for use in the finishing of rough ground plate glass surfaces which comprises in each 100 parts by weight of water, from 1 to 10 parts of cerium oxide, and from 0.5 to 5 parts cerous nitrate hexahydrate.

6. A glass polishing composition comprising in 100 parts by weight of water, from 1 to 60 parts of cerium oxide, and from 0.2 to 10 parts cerous nitrate hexahydrate.

7. A glass polishing composition comprising water, cerium oxide and cerous nitrate hexahydrate in substantially the following portions:

| | Parts |
|---|---|
| Water | 100 |
| Cerium oxide | 5 |
| $Ce(NO_3)_3 \cdot 6H_2O$ | 1 |

8. A glass polishing composition comprising water, cerium oxide and cerous nitrate hexahydrate in substantially the following portions:

| | | |
|---|---|---|
| Water | gal | 300 |
| Cerium oxide | lbs | 144 |
| Cerous nitrate hexahydrate | lbs | 50 |

9. In a method of finishing a glass surface, the step of polishing said surface by rubbing a mixture of water, cerium oxide and cerous nitrate in proportions of not less than 1.15 parts of the combined amounts of the oxide and the nitrate in the mixture to 100 parts of the water over said surface with a soft tool.

10. In a method of finishing a glass surface, the step of polishing said surface by rubbing a mixture of water, cerium oxide and cerous nitrate in proportions of 100 parts by weight of water with from 1 to 60 parts by weight of cerium oxide and from 0.15 to 7.5 parts of cerous nitrate over said surface with a soft tool.

11. A polishing composition for use in the finishing of rough ground plate surfaces which comprises, in 100 parts by weight of water, from 1 to 60 parts cerium oxide, and from 0.15 to 7.5 parts cerous nitrate.

12. A glass polishing composition as defined in claim 11 which further includes approximately 1 part by volume of a defoaming agent to each 1000 parts of said polishing composition.

13. In a method of finishing a glass surface, the step of polishing said surface by rubbing a mixture of water, cerium oxide, cerous nitrate and nitric acid, in proportions of not less than 1.4 parts of the combined amounts of the oxide and the nitrate in the mixture to 100 parts of the water, over said surface with a soft tool.

References Cited in the file of this patent

UNITED STATES PATENTS

| | | |
|---|---|---|
| 2,450,433 | Leeman | Oct. 5, 1948 |
| 2,816,824 | Wilansky | Dec. 17, 1957 |
| 2,865,725 | Schroeder | Dec. 23, 1958 |